US012698229B2

(12) United States Patent
Grant et al.

(10) Patent No.: US 12,698,229 B2
(45) Date of Patent: Aug. 4, 2026

(54) ORIFICE RING INCORPORATING A MAX PHASE MATERIAL

(71) Applicant: Owens-Brockway Glass Container Inc., Perrysburg, OH (US)

(72) Inventors: Jonathan Grant, Shreveport, LA (US); Ya-Cheng Lin, Santa Monica, CA (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 437 days.

(21) Appl. No.: 18/097,169

(22) Filed: Jan. 13, 2023

(65) Prior Publication Data

US 2024/0239699 A1 Jul. 18, 2024

(51) Int. Cl.
*C03B 7/088* (2006.01)

(52) U.S. Cl.
CPC .................................... *C03B 7/088* (2013.01)

(58) Field of Classification Search
CPC ........ C03B 7/088; C23C 4/10; C04B 35/5615
See application file for complete search history.

(56) References Cited

U.S. PATENT DOCUMENTS 4,171,966 A 10/1979 Baron et al.
5,906,666 A 5/1999 Scott et al.

6,656,576 B1 * 12/2003 Milliken ................. C03B 7/088
264/340
2019/0292085 A1 * 9/2019 Retorick ................. C03B 7/088
2019/0345052 A1 * 11/2019 Scoggins ............ C04B 35/5615

FOREIGN PATENT DOCUMENTS

EP 0413128 A1 2/1991
EP 2945207 A1 11/2015

OTHER PUBLICATIONS

PCT International Search Report and Written Opinion, Int. Application No. PCT/US2024/011207, Applicant: Owens-Brockway Glass Container Inc., Dated: Apr. 30, 2024.

* cited by examiner

*Primary Examiner* — Alison L Hindenlang
*Assistant Examiner* — Christopher Paul Daigler

(57) ABSTRACT

An orifice ring for use in a glass feeder that produces one or more molten glass runners may include a main body having a first side and an opposed second side and further defining one or more discharge orifices. The first side of the main body has a glass-contacting surface surrounding the one or more discharge orifices, and at least a portion of the glass-contacting surface of the first side of the main body is provided by a MAX phase material such that at least a portion of a circumference of at least one of the one or more discharge orifices is established by the MAX phase material. A glass feeder that includes such an orifice ring is also disclosed.

11 Claims, 4 Drawing Sheets

ORIFICE RING INCORPORATING A MAX PHASE MATERIAL

The present disclosure is directed to an orifice ring for use in a glass feeder, which is located at the discharge end of a forehearth, and more specifically to an orifice ring that incorporates a MAX phase material.

BACKGROUND

The manufacture of glass containers such as bottles and jars at high production rates may be carried out in individual section (I.S.) machines. An I.S. machine includes a bank of individual sections or modules that can form glass containers independently from one another. Each glass container produced in a section of an I.S. machine is formed from a molten glass gob of a predetermined weight. Specifically, a molten glass gob is first delivered to a blank mold of the individual section by a gob delivery system. Once in the blank mold, the glass gob is formed into a parison, which is a partially-formed container in the shape of hollow tube. The parison is then transferred from the blank mold to a blow mold of the same individual section. When in the blow mold, the parison is expanded into the final glass container. The blow-and-blow or the press-and-blow procedure is typically employed to transform the molten glass gob into the parison and then into the final glass container within the molds of the individual section of the I.S. machine.

The molten glass gobs that are fed to the individual sections of an I.S. machine are sheared from one or more streams or runners of homogenized, refined, and conditioned molten glass that exits a glass feeder located at the discharge end of a forehearth. To fashion the molten glass runners at the desired cross-sectional shape, which allows for the molten glass gobs to be sheared with precision from the runners, molten glass contained within a basin of the glass feeder is typically discharged through one or more discharge orifices defined in an orifice ring installed at the bottom of a feeder bowl. The discharge of molten glass through the discharge orifices of the orifice ring to yield molten glass runners is controlled by one or more reciprocating plungers that correspond in number and location to the one or more discharge orifices of the orifice ring. The reciprocating plunger(s) push molten glass through the orifice(s) in a timed sequence to produce molten glass runners of the desired length for shearing.

Orifice rings have conventionally been constructed from a ceramic material. Ceramics are a class of inorganic, non-metallic materials, often fired from clay materials that include aluminum and/or silica. Ceramics have a combination of properties that allows them to tolerate direct exposure to high-temperature materials for longer periods than others. For instance, ceramics in general are chemically inert and possess a low thermal conductivity, corrosion resistance, and the ability to withstand elevated temperatures. Despite these properties, ceramics may fail when initially brought into contact with molten glass. In particular, the orifice ring can experience high thermal gradients around its orifice(s) when exposed to molten glass and, consequently, may crack as a result of thermal shock. In orifice rings that include multiple discharge orifices, the part of the orifice ring that separates and partially defines a pair of adjacent orifices-termed a "ring bridge"—is particularly susceptible to crack origination and propagation. Ceramics may also fail for other reasons including the prolonged exposure to molten glass, which is an extremely corrosive substance that is typically held in a glass feeder at temperatures greater than 1100° C.

SUMMARY OF THE DISCLOSURE

The present disclosure relates to an orifice ring that incorporates a MAX phase material. A main body of the orifice ring defines one or more discharge orifices that are surrounded on a first side of a main body by a glass-contacting surface. And, in various embodiments of the present disclosure, at least a portion of the glass-contacting surface is provided by a MAX phase material such that at least one of the one or more discharge orifices is at least partially defined by the MAX phase material on the first side of the main body. The orifice ring may include only one discharge orifice, in which case the single discharge orifice is a least partially defined by the MAX phase material, or it may include multiple discharge orifices, in which case any one of the discharge orifices is at least partially defined by the MAX phase material although more than one and even all of the discharge orifices may be similarly at least partially defined by the MAX phase material. The present disclosure embodies a number of aspects that can be implemented separately from or in combination with each other as will be further described below.

According to one aspect of the present disclosure, an orifice ring for use in a glass feeder that produces one or more molten glass runners includes a main body having a first side and an opposed second side. The main body further defines one or more discharge orifices. The first side of the main body has a glass-contacting surface that surrounds the one or more discharge orifices. And at least a portion of the glass-contacting surface of the first side of the main body is provided by a MAX phase material such that at least a portion of a circumference of at least one of the one or more discharge orifices is established by the MAX phase material.

According to another aspect of the present disclosure, an orifice ring for use in a glass feeder that produces one or more molten glass runners includes a main body having a first side and an opposed second side. The main body further defines one or more discharge orifices. The first side of the main body has a glass-contacting surface that surrounds the one or more discharge orifices. At least a portion of the glass-contacting surface that spans the entirety of the one or more discharge orifices is provided by a MAX phase material.

According to yet another aspect of the present disclosure, a glass feeder for producing one or more molten glass runners that, upon exit of the feeder, are sheared into molten glass gobs includes a feeder bowl and an orifice ring. The feeder bowl has a bowl opening, and the orifice ring is sealingly engaged to the feeder bowl to close the bowl opening and delineate a bottom of a basin that holds molten glass. The orifice ring includes a main body having a first side and an opposed second side and further defining one or more discharge orifices. The first side of the main body partially delineates the basin and has a glass-contacting surface that surrounds the one or more discharge orifices while the second side of the main body has a back surface opposed to the glass-contacting surface. Moreover, at least a portion of the glass-contacting surface of the first side of the main body is provided by a MAX phase material such that at least a portion of a circumference of at least one of the one or more discharge orifices is established by the MAX phase material.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

An orifice ring may incorporate a MAX phase material to confer thermal shock and corrosion resistance, particularly in areas that are most susceptible to either or both of those types of material performance deteriorations. Thermal shock may occur when a sudden change in temperature-such as when molten glass is first brought into contact with a much colder orifice ring-generates a temperature gradient within the ring. The temperature gradient may cause the ring to crack if the thermal stress experienced by the ring exceeds the strength of the material from which the ring is constructed. The initiation of a crack may amount to failure of the orifice ring, particularly is the crack begins to propagate, and may necessitate replacement of the ring. Corrosion may occur over time as the hot, highly-corrosive molten glass attacks and dissolves the exposed surface of the orifice ring. The ring may eventually weaken and fail if the corrosion becomes too sever. Thermal shock and/or corrosion are thus two damage mechanisms that can limit the operational life of an orifice ring of a glass feeder.

A "MAX phase material" is a group of ternary carbides and nitrides that is represented generically by the chemical formula $M_{n+1}AXn$ in which "M" is an early transition metal, "A" is an A-group element, "X" is C or N, and "n"=1, 2, or 3. The early transition metal (M) may be any of Sc (Scandium), Ti (Titanium), V (Vanadium), Cr (Chromium), Zr (Zirconium), Nb (Niobium), Mo (Molybdenum), Hf (Hafnium), or Ta (Tantalum). The A-group element (A) may be any one of Al (Aluminum), Si (Silicon), P (Phosphorus), S (Sulfur), Ga (Gallium), Ge (Germanium), As (Arsenic), Cd (Cadmium), In (Indium), Sn (Tin), Tl (Thallium), or Pb (Lead). MAX phase materials exhibit characteristics of both metals and ceramics and tend to have exceptional thermal shock and corrosion resistance, among other notable properties, and also typically have a self-healing capability in which the material can spontaneously fill in and repair small cracks in an oxidizing environment, which make those materials well suited for orifice ring applications according to the present disclosure. Preferred MAX phase materials for use with the proposed subject matter include ternary carbides including, but not limited to, $Ti_3AlC_2$ and $Zr_2TlC$.

Figure 1:
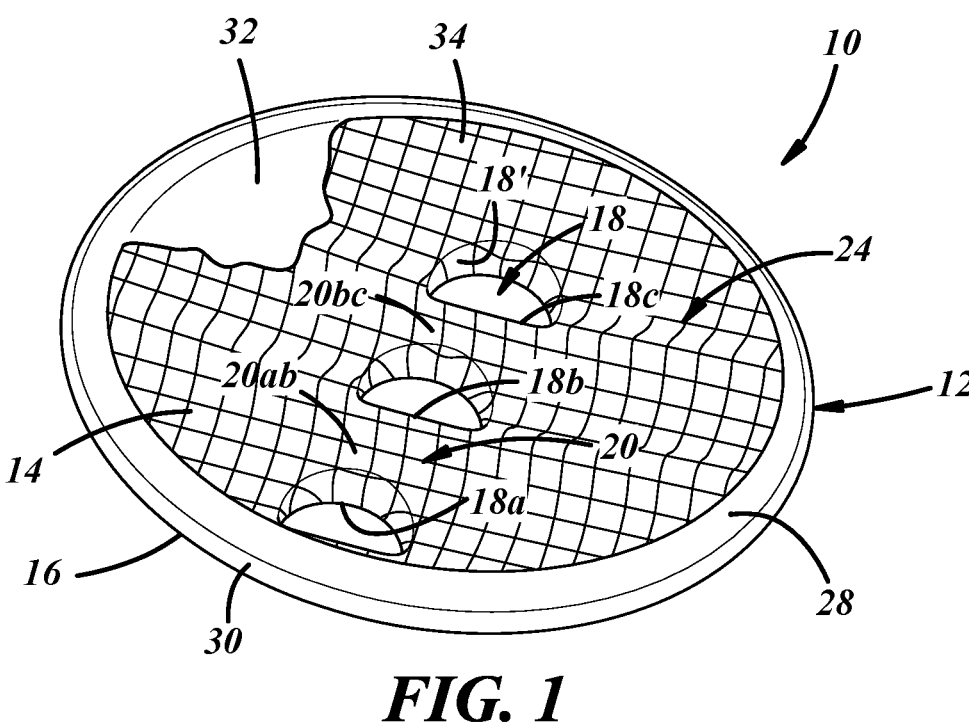
FIG. 1 is a perspective view of an orifice ring according to one embodiment of the present disclosure in which a coating of a MAX phase material provides at least a portion of a glass-contacting surface of the orifice ring.
Figure 2:
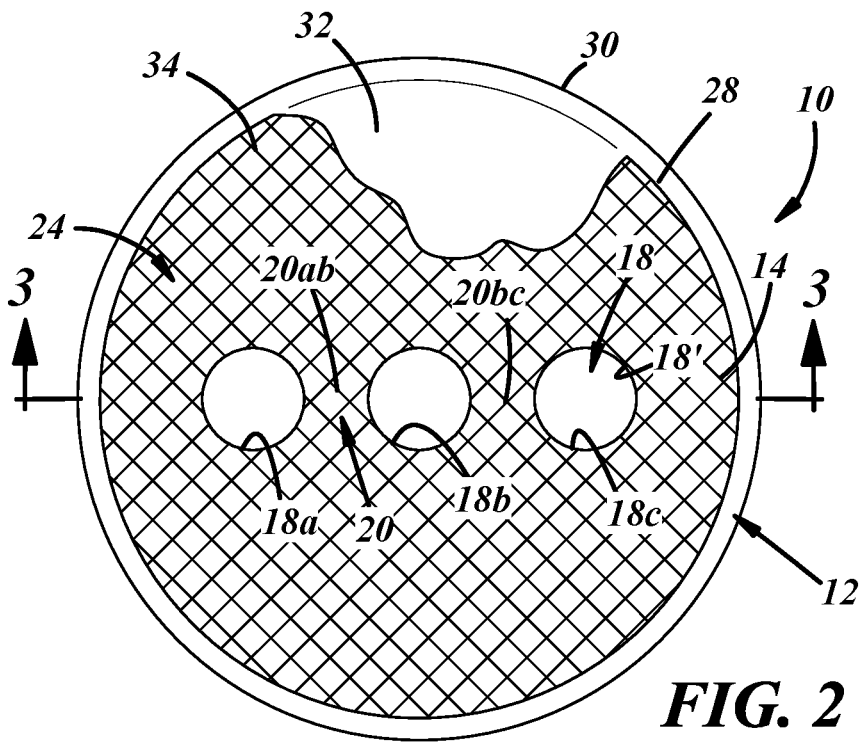
FIG. 2 is a plan view of the orifice ring depicted in FIG. 1.
Figure 3:
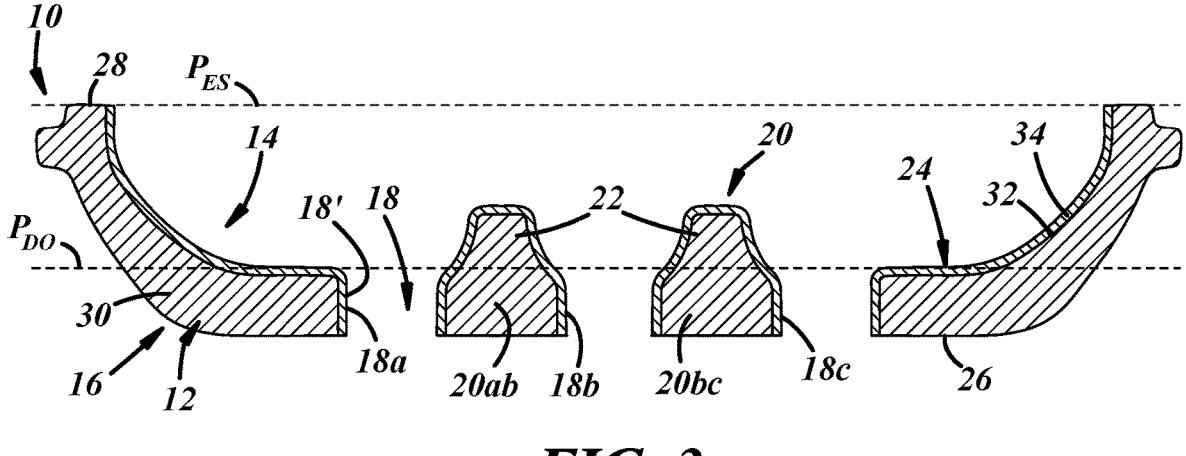
FIG. 3 is a cross-sectional view of the orifice ring depicted in FIG. 2 taken along section lines 3-3.

Referring now to FIGS. 1-3, an orifice ring 10 for use in a glass feeder (FIG. 7) that produces one or more molten glass runners includes a handleable main body 12. That main body 12 has a first side 14 and a second side 16 and may be a unitary or multi-component disc structure that defines one or more discharge orifices 18 that extend through the body 12 between the first and second sides 14, 16. Here, the main body 12 of the orifice ring 10 defines three discharge orifices 18 identified as the first, second, and third discharge orifices 18a, 18b, 18c, although in other embodiments the main body 12 may define only a single discharge orifice 18 or some other number of discharge orifices 18 (e.g., two, four, etc.). A ring bridge 20 separates and partially defines each pair of adjacent discharge orifices 18 if more than one orifice 18 is present. For example, as shown here in this embodiment, a first ring bridge 20ab separates and partially defines the first and second discharge orifices 18a, 18b, and a second ring bridge 20bc separates and partially defines the second and third discharge orifices 18b, 18c. A raised strengthening rib 22 (shown best in FIG. 3) may extend between each pair of adjacent discharge orifices 18 along the ring bridge 20 if desired.

The first side 14 of the main body 12 has a glass-contacting surface 24 and the second side 16 of the main body 12 has a back surface 26. An axial facing perimeter end surface 28 extends between and connects the glass-contacting surface 24 and the back surface 26 and, in most instances, lies in a plane PES that is upwardly displaced from plane $P_{DO}$ that extends across the openings of the discharge orifice(s) 18 on the first side 14 of the main body 12. The glass-contacting surface 24 extends radially inwardly and, in some designs, downwardly in concave or tapering fashion, from the perimeter end surface 28 of the main body 12 to the one or more discharge orifices 18. The glass-contacting surface 24 surrounds the one or more discharge orifices 18—that is, the glass-contacting surface 24 extends along the full axial depth of the discharge orifices(s) 18—and establishes a circumference 18' of each of the one or more discharge orifices 18 on the first side 14 of the main body 12. When the orifice ring 10 is in use in a glass feeder, as is explained further below, the glass-contacting surface 24 is exposed directly to and retains a volume of molten glass for discharge through the one or more discharge orifices 18. The back surface 26, on the other hand, is opposed to the glass-contacting surface 24 and does not retain molten glass and may only be inadvertently exposed to molten glass upon a molten glass runner exiting the discharge orifice(s) 18.

The MAX phase material is incorporated into the orifice ring 10 to provide all or part of the glass-contacting surface 24. At a minimum, at least a portion of the glass-contacting surface 24 is provided by the MAX phase material so that at least one of the one or more discharge orifices 18 is at least partially defined by the MAX phase material on the first side 14 of the main body 12. In this way, at least a portion of the circumference 18' of at least one of the one or more the discharge orifices 18 is established by the MAX phase material. Additionally, and in a preferred embodiment, the portion of the glass-contacting surface 24 provided by the MAX phase material entirely spans the one or more discharge orifices 18, meaning that each of the one or more discharge orifices 18 is defined entirely by the MAX phase material or, in other words, the entire circumference 18' of each of the one or more discharge orifices 18 is established by the MAX phase material. The portions of the glass-contacting surface that encompasses the ring bridge(s) 20, if present, and/or the portions of the glass-contacting material adjacent to and circumscribing each of the discharge orifices 18 are also preferably provided by a MAX phase material. Several different approaches of incorporating the MAX phase material into the orifice ring 10 consistent with this approach are described in greater detail below.

In one embodiment, and referring still to FIGS. 1-3, the main body 12 includes a unitary ceramic base substrate 30 that provides the perimeter end surface 28, the back surface 26 on the second side 16 of the main body 12, and further includes an inner surface 32 on the first side 14 of the main body 12 that extends radially inwardly and, in some instances, downwardly from the perimeter end surface 28 coextensive with the glass contacting surface 24. The ceramic base substrate 30 may be constructed from any of a wide variety of ceramics including, for example, $Al_2O_3{:}SiO_2$ or $ZrO_2{:}Al_2O_3{:}SiO_2$.

The MAX phase material may be incorporated into the orifice ring 10 of this embodiment as a surface coating 34 that covers the inner surface 32. In particular, the coating 34 of the MAX phase material may be applied extensively over the inner surface 32 of the ceramic base substrate 30 to provide the entire glass-contacting surface 24. To that end, the entire circumference 18' of each of the one or more discharge orifices 18 is established by the MAX phase material, which entirely surrounds each of the one or more discharge orifices 18 and extends all the way to the perimeter end surface 28. The coating 34 of the MAX phase material may range from 1 μm to 500 μm in thickness, although this range is not necessarily required in all instances, and may be applied by any of several types of coating techniques including physical vapor deposition, thermal spraying, cold spraying, and aerosol deposition.

Variations of the orifice ring 10 shown in FIGS. 1-3 are possible while still ensuring that at least a portion of the glass-contacting surface 24 is provided by the MAX phase material so that at least one of the one or more discharge orifices 18 is at least partially defined by the MAX phase material on the first side 14 of the main body 12. In describing these other embodiments described below, like numbers are used to refer to like elements, and only the material differences of the other orifice embodiments as they relate to the orifice ring 10 described above are discussed in any detail. The structure and related discussion of the orifice ring 10 as shown in FIGS. 1-3 are thus equally applicable to and is incorporated into the discussions of the several other orifice ring embodiments described below unless stated otherwise.

Figure 4:
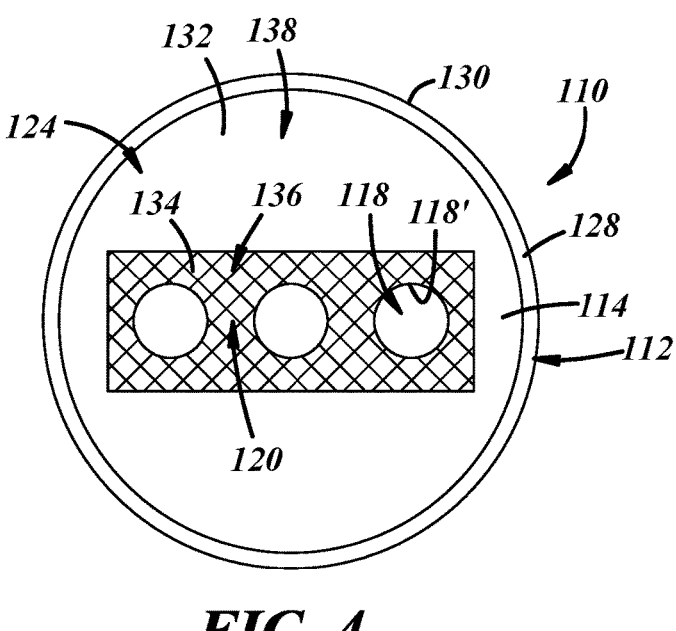
FIG. 4 is a plan view of an orifice ring according to another embodiment of the present disclosure in which, like the embodiment of FIG. 1, a coating of a MAX phase material provides at least a portion of a glass-contacting surface of the orifice ring.

Referring now to FIG. 4, another embodiment of the orifice ring, which is identified by reference numeral 110, is shown in which the main body 112 may again be a unitary ceramic base substrate 130 and the MAX phase material may again be incorporated into the orifice ring 110 as a surface coating 134. The difference here in relation to the embodiment shown in FIGS. 1-3 is that the coating 134 of the MAX phase material may be applied over only part of the inner surface 132 of the ceramic base substrate 130 on the first side 114 of the main body 112 such that the coating 134 constitutes only part of the glass-contacting surface 124. Specifically, as shown, and as a result of the application of the coating 134 of the MAX phase material, the glass contacting surface 124 includes a first interior portion 136 and a second exterior portion 138. The first interior portion 136 of the glass-contacting surface 124 is provided by the coating 134 of the MAX phase material and may be a single continuous portion that encompasses the entirety of the one or more discharge orifices 118, including the ring bridge(s) 120 if present. The first interior portion 136 of the glass-contacting surface 124 thus fully circumscribes each of the orifices 118. The second exterior portion 138 of the glass-contacting surface 124, which surrounds the first interior portion 136 and extends to the perimeter end surface 128, is not coated with the MAX phase material and, as such, is provided by the inner surface 132 of the ceramic base substrate 130. Accordingly, in this embodiment, the coating 134 of the MAX phase material and the inner surface 132 of the ceramic base substrate together constitute the glass-contacting surface 124

The first interior portion 136 of the glass-contacting surface 124 as provided by the coating 134 of the MAX phase material entirely surrounds each of the one or more discharge orifices 118, similar to the previous embodiment, and thus establishes the entire circumference 118' of each of the one or more discharge orifices 118 but without constituting the entire glass-contacting surface 124. The application of the coating 134 of the MAX phase material to only part of the inner surface 132 of the ceramic base substrate 130 may be practiced for a number of reasons. To be sure, it may be desired to limit the amount of MAX phase material used in the orifice ring 110 for cost containment or other reasons while still benefiting from its use. Applying the coating 134 of the MAX phase material to only part of the inner surface 132 of the ceramic base substrate 130 may also be viewed as an easy way to reinforce standard ceramic orifice rings that are widely available in the commercial marketplace or to repair current ceramic orifice rings that have suffered some damage proximate to the one or more discharge orifices 118.

Figure 5:
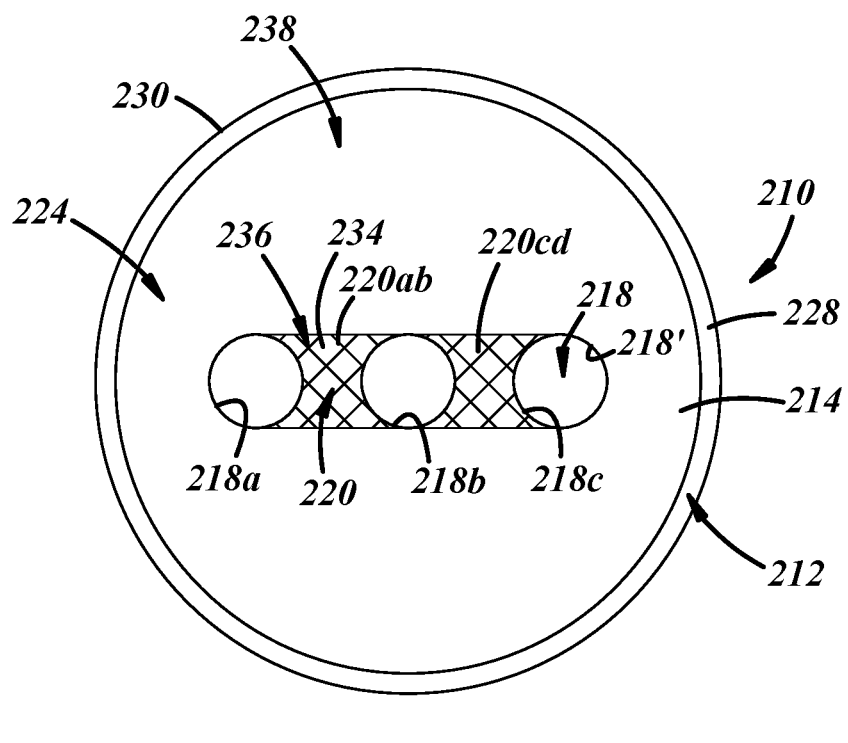
FIG. 5 is a perspective view of an orifice ring according to yet another embodiment of the present disclosure in which, like the embodiments of FIGS. 1-4, a coating of a MAX phase material provides at least a portion of a glass-contacting surface of the orifice ring.

Referring now to FIG. 5, another embodiment of the orifice ring, which is identified by reference numeral 210, is shown in which the main body 212 may again be a unitary ceramic base substrate 230 and the MAX phase material may again be incorporated into the orifice ring 210 as a surface coating 234. In this embodiment of the orifice ring 210, like before in the embodiment described in FIG. 4, the coating 234 of the MAX phase material may be applied over part of the inner surface 232 of the ceramic base substrate 230 on the first side 214 of the main body 212 to provide only part of the glass-contacting surface 224. And, and as a result of the application of the coating 234 of the MAX phase material, the glass contacting surface 224 includes a first interior portion 236 and a second exterior portion 238. Here, however, the first interior portion 236 of the glass-contacting surface 224, which is provided by the coating 234 of the MAX phase material, covers only the ring bridge(s) 220 that separate and partially define an adjacent pair of discharge orifices 218. For example, as shown in this particular embodiment, the first interior portion 236 of the glass contacting surface 224 spans only each of the first ring bridge 220ab and the second ring bridge 220bc. In that regard, the first interior portion 236 of the glass-contacting surface 224 fully surrounds the central orifice 218b and only partially surrounds each of the discharge orifices 218a, 218c disposed adjacent to the central orifice 218b; that is, the first interior portion 236 of the glass-contacting surface 224 establishes the entire circumference 218' of the central orifice 218b and only partially establishes the circumference 218' of each of the other discharge orifices 218b, 218c.

Figure 6:
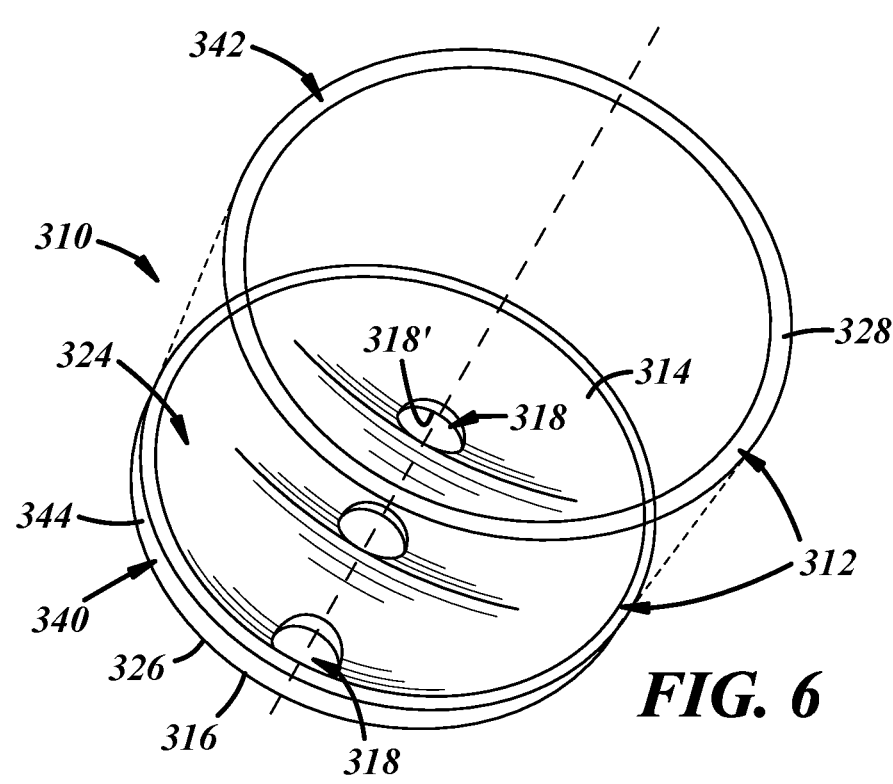
FIG. 6 is an exploded perspective view of an orifice ring according to still another embodiment of the present disclosure in which a central base wall of the orifice ring that defines the one or more discharge orifices and provides a glass-contacting surface of the orifice ring is constructed from a MAX phase material.

Referring now to FIG. 6, another embodiment of the orifice ring, identified by reference numeral 310, is shown that is somewhat different from the previous embodiments. Here, in this embodiment, the main body 312 of the orifice ring includes a central base wall 340 and a peripheral rim 342 that are fixedly secured together. The base wall 340 defines the one or more discharge orifices 318 and includes the glass-contacting surface 324 and the opposed back surface 326 of the main body 312, while the peripheral rim 342 circumferentially surrounds an edge 344 of the base wall 340 and includes the perimeter end surface 328 of the main body 312. The base wall 340 is constructed from a MAX phase material, and as a result, provides the entire glass-contacting surface 324. The entire circumference 318' of each of the one or more discharge orifices 318 is thus established by the MAX phase material, which entirely surrounds each of the one or more discharge orifices 318 and extends all the way to the perimeter end surface 328 when the central base wall 340 and the peripheral rim 342 are secured together. The peripheral rim 342 may be constructed from a ceramic such as, for example, $Al_2O_3:SiO_2$ or $ZrO_2:Al_2O_3:SiO_2$, or it may be constructed from some other suitable material.

The base wall 340 and the peripheral rim 342 may be fixedly secured together in a number of ways including through mechanical fasteners, mechanical interlocking, and applicable bonding techniques. The multi-component hybrid structure of the main body 312 of the orifice ring 310 may be desirable in certain applications since the base wall 340 will have consistent material properties as a result of having a bulk MAX phase material structure and composition across its thickness. Additionally, the processing step or steps associated with applying a coating of a MAX phase material to an underlying substrate are avoided in the manufacture of the orifice ring 310 of this embodiment, which may amount to a manufacturing convenience if the additional step of fixedly securing the peripheral rim 342 to the central base wall 340 is more practical and/or less time-consuming in a manufacturing setting.

Figure 7:
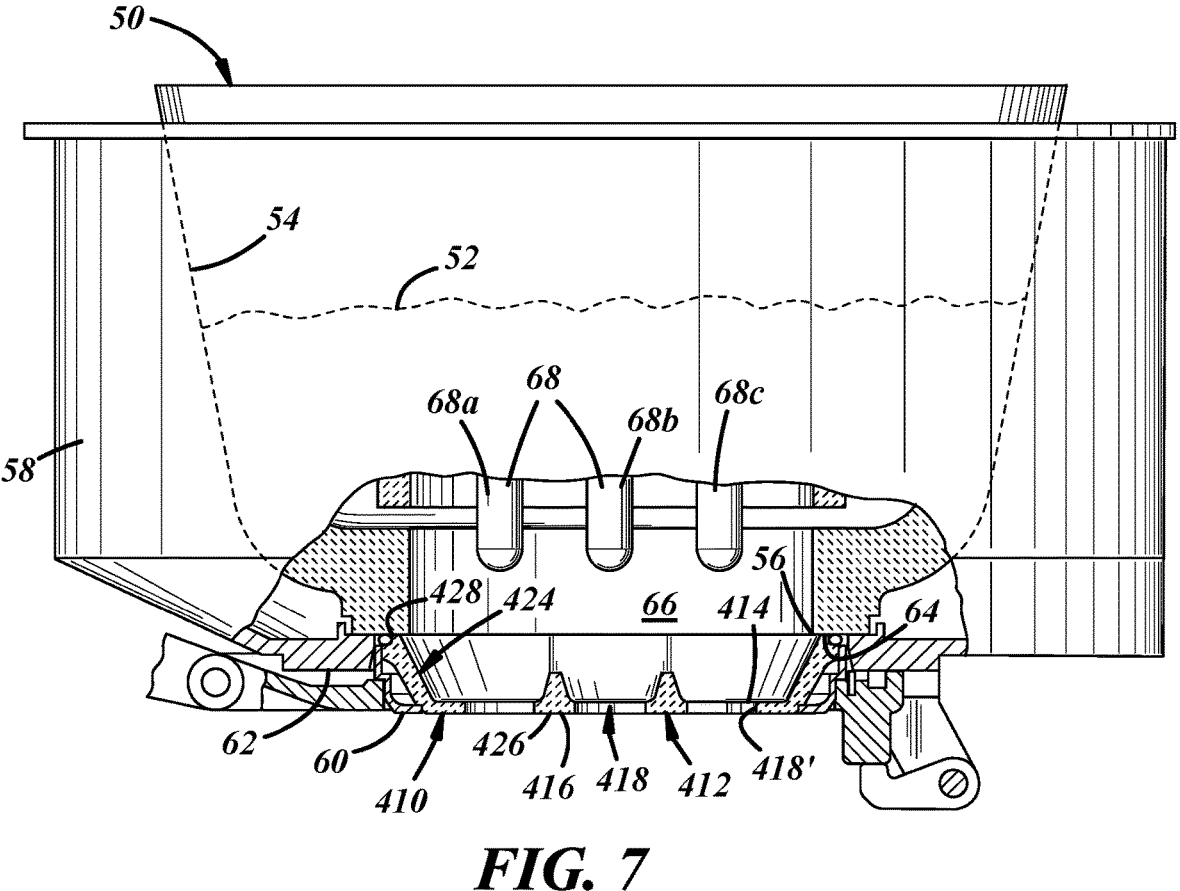
FIG. 7 is a cross-sectional view of a glass feeder that includes an orifice ring according to various embodiments of the present disclosure.

The several orifice ring embodiments described above may be used in a glass feeder that produces one or more molten glass runners which, upon exiting the glass feeder, are sheared into molten glass gobs of a predetermined weight for delivery to one or more individual sections of an I.S. machine. A glass feeder 50 of the aforementioned type that receives molten glass 52 (depicted here only in phantom) from an outlet of a discharge end of a forehearth is shown in FIG. 7. The molten glass 52 that is feed into the glass feeder 50 and then discharged in the form of molten glass runners may be soda-lime-silica glass. Soda-lime-silica glass is used extensively throughout the glass container manufacturing industry to fabricate glass containers and has a glass chemistry that includes 60 wt % to 80 wt % silica, 8 wt % to 18 wt % sodium oxide, and 5 wt % to 15 wt % calcium oxide. The glass chemistry of soda-lime-silica glass may also include one or more other optional materials such as 0-3 wt % aluminum oxide ($Al_2O_3$), 0-4 wt % magnesium oxide (MgO), 0-1.5 wt % potassium oxide ($K_2O$), 0-1 wt % iron oxide ($Fe_2O_3$), 0-0.5 wt % titanium oxide ($TiO_2$), and 0-0.5 wt % sulfur trioxide ($SO_3$), plus a variety of other materials known to skilled artisans including colorants, decolorants, fining agents, reduction agents, oxidation agents, etc.

The glass feeder 50 includes a feeder bowl 54 and an orifice ring 410. The orifice ring 410 shown here is representative of all of the orifice rings 10, 110, 210, 310 described above. To that end, the orifice ring 410 includes a main body 412 that has a first side 414 and a second side 416 and defines one or more discharge orifices 418. The first side 414 of the main body 412 has a glass-contacting surface 424 and the second side 416 of the main body 412 has a back surface 426 opposed to the glass-contacting surface 424. The glass-contacting surface 424 extends inwardly and, in some designs, downwardly in concave or tapering fashion, from a perimeter end surface 428 of the main body 412 to the one or more discharge orifices 418. And, consistent with the orifice ring embodiments shown in FIGS. 1-6 and described above, at least a portion of the glass-contacting surface 424 is provided by the MAX phase material so that at least one of the one or more discharge orifices 418 is at least partially defined by the MAX phase material; that is, at least a portion of a circumference 418' of at least one of the one or more the discharge orifices 418 is established by the MAX phase material.

The feeder bowl 54 has a bowl opening 56 and is carried beneath the outlet of the forehearth (not shown) by an open-bottom metal frame 58 in the embodiment shown here. The orifice ring 410 is sealingly engaged to the feeder bowl 54 to close the bowl opening 56. For example, the orifice ring 410 may be carried by a support pan 60 that is hingedly coupled to a bottom 62 of the metal frame 58. The support pan 60 can be clamped in place to press and seal the perimeter end surface 428 of the main body 412 of the orifice ring 410 against a mating and axially-facing circumferential end surface 64 of the feeder bowl 54 located around the bowl opening 56. As such, the feeder bowl 54 and the orifice ring 410 together define a basin 66 for holding a volume of the molten glass 52 with the orifice ring 410 constituting the bottom of the basin 66. More specifically, the first side 414 of the main body 412 of the orifice ring 410 and its glass-contacting surface 424 partially delineate the basin 66 and, thus, are in direct contact with the volume of molten glass 52 held in the basin 66 of the feeder bowl 54.

The glass feeder 50 also includes one or more reciprocating plungers 68 that correspond in number and location to the one or more discharge orifices 418 of the orifice ring 410. A reciprocating plunger 68 is axially-aligned with each discharge orifice 418 and, in operation, is repeatedly advanced toward and retracted away from the orifice 418 in a timed sequence to controllably push molten glass 52 through its corresponding discharge orifice 418 to produce a molten glass runner for shearing. Three reciprocating plungers 68a, 68b, 68c are shown here in FIG. 7 in corresponding relation to the three discharge orifices 418 of the orifice ring 410. The one or more discharge orifices 418 determine the cross-sectional size and shape of the molten glass runners and, by extension, of the molten glass gobs sheared from the runners. The one or more discharge orifices 418 are usually designed for the production of a particular glass container in the I.S machine and, for that reason, the orifice ring 410 may be frequently installed and uninstalled from the glass feeder 50. Among other benefits, the MAX phase material that provides at least a portion of the glass-contacting surface 424 of the main body 412 helps the orifice ring 410 withstand damage due to thermal shock when first installed on the glass feeder 50 and brought into direct contact with the much hotter molten glass 52, and also helps the orifice ring 410 withstand the corrosive nature of the molten glass 50 when installed and operational.

There thus has been disclosed an orifice ring that incorporates a MAX phase material and a glass feeder that includes the same. The disclosure has been presented in conjunction with several illustrative embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. An orifice ring for use in a glass feeder that produces one or more molten glass runners, the orifice ring comprising:

a main body having a first side and an opposed second side and further defining one or more discharge orifices, the first side of the main body having a glass-contacting surface surrounding the one or more discharge orifices, wherein a portion of the main body is composed of a ceramic material and wherein at least a portion of the glass-contacting surface of the first side of the main body is provided by a MAX phase material such that at least a portion of a circumference of at least one of the one or more discharge orifices is established by the MAX phase material, wherein the main body includes a central base wall and a peripheral rim surrounding the central base wall, the central base wall defining the one or more discharge orifices and including the glass-contacting surface on the first side of the main body, and wherein the peripheral rim is composed of a ceramic material and the central base wall is composed of the MAX phase material.

2. The orifice ring set forth in claim 1, wherein the one or more discharge orifices includes between one and three discharge orifices.

3. The orifice ring set forth in claim 1, wherein the MAX phase material is a ternary carbide.

4. The orifice ring set forth in claim 3, wherein the MAX phase material is comprised of $Ti_3AlC_2$ or $Zr_2TiC$.

5. An orifice ring for use in a glass feeder that produces one or more molten glass runners, the orifice ring comprising:

a main body having a first side and an opposed second side and further defining one or more discharge orifices, the first side of the main body having a glass-contacting surface surrounding the one or more discharge orifices, wherein a portion of the main body is composed of a ceramic material and wherein at least a portion of the glass-contacting surface that spans the entirety of the one or more discharge orifices is provided by a MAX phase material, wherein the entire glass contacting surface is provided by a MAX phase material, and wherein the main body includes a central base wall and a peripheral rim surrounding the central base wall, the base wall defining the one or more discharge orifices and including the glass-contacting surface, and wherein the central base wall is composed of the MAX phase material.

6. The orifice ring set forth in claim 5, wherein the peripheral rim is composed of a ceramic material.

7. The orifice ring set forth in claim 5, wherein the MAX phase material is a ternary carbide.

8. The orifice ring set forth in claim 7, wherein the MAX phase material is comprised of $Ti_3AlC_2$ or $Zr_2TiC$.

9. A glass feeder for producing one or more molten glass runners that, upon exit of the feeder, are sheared into molten glass gobs, the glass feeder comprising:

a feeder bowl having a bowl opening;

the orifice ring of claim 1 sealingly engaged to the feeder bowl to close the bowl opening and constitute a bottom of a basin for holding molten glass, the first side of the main body further partially delineating the basin the second side of the main body having a back surface opposed to the glass-contacting surface.

10. An orifice ring for use in a glass feeder that produces one or more molten glass runners, the orifice ring comprising:

a main body having a first side and an opposed second side and further defining one or more discharge orifices, the first side of the main body having a glass-contacting surface surrounding the one or more discharge orifices, wherein a portion of the main body is composed of a ceramic material and wherein at least a portion of the glass-contacting surface of the first side of the main body is provided by a MAX phase material such that at least a portion of a circumference of at least one of the one or more discharge orifices is composed of the MAX phase material.

11. A glass feeder for producing one or more molten glass runners that, upon exit of the feeder, are sheared into molten glass gobs, the glass feeder comprising:

a feeder bowl having a bowl opening;

the orifice ring of claim 5 sealingly engaged to the feeder bowl to close the bowl opening and constitute a bottom of a basin for holding molten glass, the first side of the main body further partially delineating the basin, the second side of the main body having a back surface opposed to the glass-contacting surface.

* * * * *